United States Patent
Jung et al.

(10) Patent No.: US 12,022,132 B2
(45) Date of Patent: *Jun. 25, 2024

(54) VIDEO SIGNAL PROCESSING METHOD AND DEVICE FOR SIGNALING PREDICTION MODE

(71) Applicant: SAMSUNG ELECTRONICS CO., LTD., Suwon-si (KR)

(72) Inventors: Jaehong Jung, Seoul (KR); Juhyung Son, Uiwang-Si (KR); Dongcheol Kim, Suwon-Si (KR); Geonjung Ko, Seoul (KR); Jinsam Kwak, Anyang-Si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,534

(22) Filed: Dec. 27, 2022

(65) Prior Publication Data

US 2023/0126913 A1 Apr. 27, 2023

Related U.S. Application Data

(63) Continuation of application No. 17/244,083, filed on Apr. 29, 2021, now Pat. No. 11,570,483, which is a (Continued)

(30) Foreign Application Priority Data

Dec. 17, 2018 (KR) ........................ 10-2018-0162805
Dec. 31, 2018 (KR) ........................ 10-2018-0174322

(51) Int. Cl.
H04N 19/70 (2014.01)
H04N 19/176 (2014.01)
(Continued)

(52) U.S. Cl.
CPC .......... *H04N 19/96* (2014.11); *H04N 19/176* (2014.11); *H04N 19/184* (2014.11); *H04N 19/70* (2014.11)

(58) Field of Classification Search
None
See application file for complete search history.

(56) References Cited

U.S. PATENT DOCUMENTS 11,051,036 B2  6/2021 Lin
11,172,203 B2  11/2021 Chiang
(Continued)

FOREIGN PATENT DOCUMENTS

KR   10-2012-0125160 A   11/2012
KR   10-2013-0084314 A   7/2013
(Continued)

OTHER PUBLICATIONS

International Search Report of International application No. PCT/KR2019/017926, dated Apr. 13, 2020.
(Continued)

*Primary Examiner* — Mohammad J Rahman
(74) *Attorney, Agent, or Firm* — Sughrue Mion, PLLC

(57) ABSTRACT

A video signal processing method comprises: obtaining, from a bitstream, a skip parameter (cu_skip_flag) indicating whether a skip mode is applied to a current block; when the skip parameter indicates that a mode is not the skip mode, obtaining, from the bitstream, a merge parameter (merge_flag) indicating whether the current block is coded with a merge mode; and determining whether a coded block flag (CBF) parameter (cu_cbf), which indicates whether a syntax element related to transform is obtained from the bitstream, is obtained, according to a value of the merge parameter, wherein, when the value of the merge parameter indicates
(Continued)

the merge mode, the CBF parameter is not obtained from the bitstream and is determined to be a preconfigured value.

3 Claims, 10 Drawing Sheets

Related U.S. Application Data continuation of application No. PCT/KR2019/017926, filed on Dec. 17, 2019.

(51) Int. Cl.
*H04N 19/184* (2014.01)
*H04N 19/96* (2014.01)

(56) References Cited

U.S. PATENT DOCUMENTS

| | | | |
|---|---|---|---|
| 11,218,721 B2 | 1/2022 | Chiang | |
| 2013/0016782 A1 | 1/2013 | Sasai | |
| 2013/0058410 A1 | 3/2013 | Yasugi | |
| 2013/0279577 A1 | 10/2013 | Schwarz et al. | |
| 2014/0072033 A1 | 3/2014 | Chuang | |
| 2014/0241436 A1* | 8/2014 | Laroche | H04N 19/139 375/240.16 |
| 2017/0064328 A1 | 3/2017 | Na et al. | |
| 2017/0272782 A1* | 9/2017 | Li | H04N 19/96 |
| 2017/0339431 A1 | 11/2017 | Zhang | |
| 2018/0070100 A1 | 3/2018 | Chen | |
| 2018/0131954 A1 | 5/2018 | Zhou | |
| 2019/0045195 A1* | 2/2019 | Gokhale | H04N 19/14 |
| 2019/0045198 A1 | 2/2019 | Mahdi | |
| 2021/0006821 A1 | 1/2021 | Schwarz | |
| 2021/0037237 A1* | 2/2021 | Hsiang | H04N 19/70 |
| 2021/0152823 A1 | 5/2021 | Park | |
| 2021/0152843 A1 | 5/2021 | Lee | |
| 2021/0266561 A1 | 8/2021 | Jeong | |

FOREIGN PATENT DOCUMENTS

| | | |
|---|---|---|
| KR | 10-2018-0122638 A | 11/2018 |
| WO | 2017209328 A | 12/2017 |

OTHER PUBLICATIONS

Chiang. Man-shu et al. CEI 0.1.1: Multi-hypothesis prediction for improving AMVP mode, skip or merge mode, and mtra mode. Joint Video Experts Team (JVET) ofITU-T SG 16 WP 3 and ISO/IEC JTC 1/SC 29/'NG II. JVET-L0I00-v3. 12th Meeting. Macao, CN. pp. 1-14. Oct. 12, 2018, [Retrieved on Apr. 3, 2020], Retrieved from [http://phenix.int-evry .fr/jveV) See pp. 3-6.

Written Opinion of International application No. PCT/KR2019/017926, dated Apr. 13, 2020.

Non-Final Rejection of U.S. Appl. No. 17/244,083 from the USPTO dated Jan. 21, 2022.

Final Rejection of U.S. Appl. No. 17/244,083 from the USPTO dated Aug. 5, 2022.

Notice of Allowance of U.S. Appl. No. 17/244,083 from the USPTO dated Nov. 23, 2022.

* cited by examiner

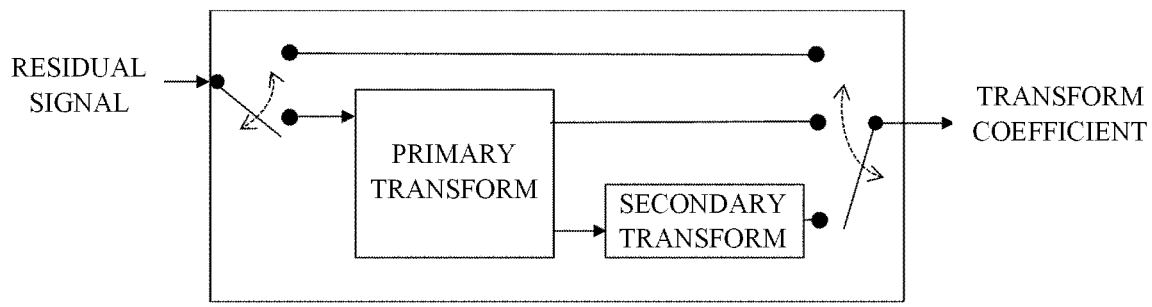

FIG. 8

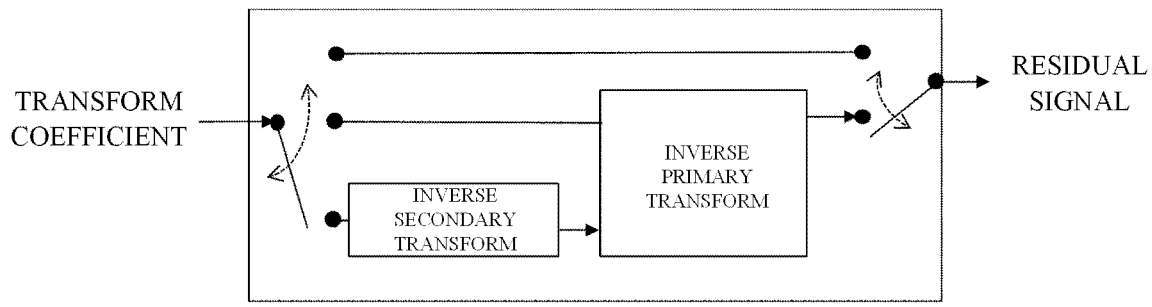

FIG. 9

| coding_unit( x0, y0, cbWidth, cbHeight, treeType ) { | Descriptor |
|---|---|
| 1010 — if( slice_type != I ) { | |
|     cu_skip_flag[ x0 ][ y0 ] | ae(v) |
| 1020 — if( cu_skip_flag[ x0 ][ y0 ] == 0 ) | |
|     pred_mode_flag | ae(v) |
|   } | |
| 1030 — if( CuPredMode[ x0 ][ y0 ] == MODE_INTRA ) { | |
| 1040 — if( pcm_enabled_flag && | |
|     cbWidth >= MinIpcmCbSizeY && cbWidth <= MaxIpcmCbSizeY && | |
|     cbHeight >= MinIpcmCbSizeY && cbHeight <= MaxIpcmCbSizeY ) | |
|     pcm_flag[ x0 ][ y0 ] | ae(v) |
|     ... | |
| } else { /* MODE_INTER */ | |
| 1050 — if( cu_skip_flag[ x0 ][ y0 ] ) { | |
|     ... | |
| } else { | |
|     merge_flag[ x0 ][ y0 ] | ae(v) |
|     ... | |
| } | |
| } | |
| 1060 — if( !pcm_flag[ x0 ][ y0 ] ) { | |
| 1070 — if( CuPredMode[ x0 ][ y0 ] != MODE_INTRA && cu_skip_flag[ x0 ][ y0 ] == 0 ) | |
|     cu_cbf | ae(v) |
| 1080 — if( cu_cbf ) | |
|     transform_tree( x0, y0, cbWidth, cbHeight, treeType ) | |
| } | |
| } | |

FIG. 10 pred_mode_flag equal to 0 specifies that the current coding unit is coded in inter prediction mode. pred_mode_flag equal to 1 specifies that the current coding unit is coded in intra prediction mode. The variable CuPredMode[ x ][ y ] is derived as follows for x = x0..x0 + cbWidth − 1 and y = y0..y0 + cbHeight − 1:

- If pred_mode_flag is equal to 0, CuPredMode[ x ][ y ] is set equal to MODE_INTER.
- Otherwise (pred_mode_flag is equal to 1), CuPredMode[ x ][ y ] is set equal to MODE_INTRA.

When pred_mode_flag is not present, the variable CuPredMode[ x ][ y ] is inferred to be equal to MODE_INTRA for x = x0 .. x0+cbWidth - 1 and
y = y0 .. y0+cbHeight - 1.

FIG. 11 pred_mode_flag equal to 0 specifies that the current coding unit is coded in inter prediction mode. pred_mode_flag equal to 1 specifies that the current coding unit is coded in intra prediction mode. The variable CuPredMode[ x ][ y ] is derived as follows for x = x0..x0 + cbWidth − 1 and y = y0..y0 + cbHeight − 1:

- If pred_mode_flag is equal to 0, CuPredMode[ x ][ y ] is set equal to MODE_INTER.
- Otherwise (pred_mode_flag is equal to 1), CuPredMode[ x ][ y ] is set equal to MODE_INTRA.

When pred_mode_flag is not present, the variable CuPredMode[ x ][ y ] is inferred as follows for x = x0..x0 + cbWidth − 1 and y = y0..y0 + cbHeight − 1:

- If cu_skip_flag[ x0 ][ y0 ] is equal to 1, CuPredMode[ x ][ y ] is set equal to MODE_SKIP.
- Otherwise(cu_skip_flag[ x0 ][ y0 ] is equal to 0), CuPredMode [ x ][ y ] is set equal to MODE_INTRA.

FIG. 12 cu_cbf equal to 1 specifies that the transform_tree( ) syntax structure is present for the current coding unit. cu_cbf equal to 0 specifies that the transform_tree( ) syntax structure is not present for the current coding unit.

When cu_cbf is not present, it is inferred as follows:

- If cu_skip_flag[ x0 ][ y0 ] is equal to 1, cu_cbf is inferred to be equal to 0.
- Otherwise, cu_cbf is inferred to be equal to 1.

FIG. 13

| coding_unit( x0, y0, cbWidth, cbHeight, treeType ) { | Descriptor |
|---|---|
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|     pcm_flag[ x0 ][ y0 ] | ae(v) |
|     ... | |
|   } else { /* MODE_INTER */ | |
|     if( cu_skip_flag[ x0 ][ y0 ] ) { | |
|       ... | |
|     } else { | |
|       merge_flag[ x0 ][ y0 ] | ae(v) |
|       ... | |
|     } | |
|   } | |
|   if( !pcm_flag[ x0 ][ y0 ] ) { | |
|     if( CuPredMode[ x0 ][ y0 ] != MODE_INTRA && !merge_flag[ x0 ][ y0 ] ) | |
|     cu_cbf | ae(v) |
|     if( cu_cbf ) | |
|       transform_tree( x0, y0, cbWidth, cbHeight, treeType ) | |
|   } | |
| } | |

| coding_unit( x0, y0,log2CbSize ) { | Descriptor |
|---|---|
|   ... | |
|   if( !pcm_flag[ x0 ][ y0 ] ) { | |
|     if( CuPredMode[ x0 ][ y0 ] != MODE_INTRA && | |
|       !( PartMode = = PART_2Nx2N && merge_flag[ x0 ][ y0 ] ) ) | |
|     rqt_root_cbf | ae(v) |
|     if( rqt_root_cbf ) { | |
|       MaxTrafoDepth = ( CuPredMode[ x0 ][ y0 ] = = MODE_INTRA ? | |
|                     ( max_transform_hierarchy_depth_intra + IntraSplitFlag ) : | |
|                     ( max_transform_hierarchy_depth_inter ) | |
|       transform_tree( x0, y0, x0, y0, log2CbSize, 0, 0 ) | |
|   } | |
| } | |

(a)

rqt_root_cbf equal to 1 specifies that the transform_tree() syntax structure is present for the current coding unit. rqt_root_cbf equal to 0 specifies that the transform_tree() syntax structure is not present for the current coding unit.

When rqt_root_cbf is not present, its value is inferred to be equal to 1.

| coding_unit( x0, y0,log2CbSize ) { | Descriptor |
|---|---|
| ... | |
|   if( !pcm_flag[ x0 ][ y0 ] ) { | |
|     if( CuPredMode[ x0 ][ y0 ] != MODE_INTRA && | |
|       !( PartMode == PART_2Nx2N && merge_flag[ x0 ][ y0 ] ) ) | |
|     rqt_root_cbf | ae(v) |
|   if( rqt_root_cbf ) { | |
|     MaxTrafoDepth = ( CuPredMode[ x0 ][ y0 ] == MODE_INTRA ? | |
|         ( max_transform_hierarchy_depth_intra + IntraSplitFlag ) : | |
|         ( max_transform_hierarchy_depth_inter ) | |
|     transform_tree( x0, y0, x0, y0, log2CbSize, 0, 0 ) | |
|   } | |
| } | |

(a)

rqt_root_cbf equal to 1 specifies that the transform_tree() syntax structure is present for the current coding unit. rqt_root_cbf equal to 0 specifies that the transform_tree() syntax structure is not present for the current coding unit.

When rqt_root_cbf is not present, it is inferred as follows:

–   If cu_skip_flag[ x0 ][ y0 ] is equal to 1, rqt_root_cbf is inferred to be equal to 0.
–   Otherwise, rqt_root_cbf is inferred to be equal to 1.

VIDEO SIGNAL PROCESSING METHOD AND DEVICE FOR SIGNALING PREDICTION MODE

CROSS-REFERENCE TO RELATED APPLICATIONS

This application is a continuation of U.S. application Ser. No. 17/244,083, which was filed on Apr. 29, 2021, and which is a continuation of pending PCT International Application No. PCT/KR2019/017926, which was filed on Dec. 17, 2019, and which claims priority under 35 U.S.C 119(a) to Korean Patent Application No. 10-2018-0162805 filed with the Korean Intellectual Property Office on Dec. 17, 2018, and Korean Patent Application No. 10-2018-0174322 filed with the Korean Intellectual Property Office on Dec. 31, 2018. The disclosures of the above patent applications are incorporated herein by reference in their entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DETAILED DESCRIPTION OF THE INVENTION

Technical Problem

The aspect of the present disclosure is to improve the coding efficiency of a video signal.

Technical Solution

In order to solve the above problems, the present disclosure provides a video signal processing device and a video signal processing method as follows.

According to an embodiment of the present disclosure, a video signal processing method includes: obtaining, from a bitstream, a skip parameter (cu_skip_flag) indicating whether a skip mode is applied to a current block; if the skip parameter indicates that a mode is not the skip mode, obtaining, from the bitstream, a merge parameter (merge_flag) indicating whether the current block is coded with a merge mode; and determining whether a coded block flag (CBF) parameter (cu_cbf), which indicates whether a syntax element related to transform is obtained from the bitstream, is obtained, according to a value of the merge parameter. When the value of the merge parameter indicates the merge mode, the CBF parameter may not be obtained from the bitstream and may be determined to be a preconfigured value.

According to an embodiment of the present disclosure, a video signal processing method includes: generating a skip parameter (cu_skip_flag) indicating whether a skip mode is applied to a current block; generating a merge parameter (merge_flag) indicating whether the current block is coded with a merge mode; generating a CBF parameter (cu_cbf) indicating whether a syntax element related to transform of the current block is obtained from a bitstream; and generating a bitstream including at least one of the skip parameter, the merge parameter, and the CBF parameter, wherein whether the CBF parameter is included in the bitstream is determined according to a value of the merge parameter, and if the value of the merge parameter indicates the merge mode, the CBF parameter is not included in the bitstream, and is determined to be a preconfigured value.

According to an embodiment of the present disclosure, a video signal processing device includes a processor, the processor is configure to: obtains from a bitstream, a skip parameter (cu_skip_flag) indicating whether a skip mode is applied to a current block, when the skip parameter indicates that a mode is not the skip mode, obtain, from the bitstream, a merge parameter (merge_flag) indicating whether the current block is coded with a merge mode, and determine whether a CBF parameter (cu_cbf), which indicates whether a syntax element related to transform is obtained from the bitstream, is obtained, according to a value of the merge parameter, wherein, when the value of the merge parameter indicates the merge mode, the CBF parameter is not obtained from the bitstream, and is determined to be a preconfigured value.

According to an embodiment of the present disclosure, a video signal processing device includes a processor, the processor is configured to: generate a skip parameter (cu_skip_flag) indicating whether a skip mode is applied to a current block, generate a merge parameter (merge_flag) indicating whether the current block is coded with a merge mode, generate a CBF parameter (cu_cbf) indicating whether a syntax element related to transform of the current block is obtained from a bitstream, and generate a bitstream including at least one of the skip parameter, the merge parameter, and the CBF parameter, wherein whether the CBF parameter is included in the bitstream is determined according to a value of the merge parameter, and when the value of the merge parameter indicates the merge mode, the CBF parameter is not included in the bitstream.

An embodiment of the present disclosure provides a computer-readable recording medium in which a bitstream for video signal processing is stored, wherein the bitstream: includes a skip parameter (cu_skip_flag) indicating whether a skip mode is applied to a current block; when the skip parameter indicates that a mode is not the skip mode, further includes a merge parameter (merge_flag) indicating whether the current block is coded with a merge mode; and when a prediction mode of the current block is not an intra prediction mode and if a value of the merge parameter does not indicate the merge mode, further includes a CBF parameter (cu_cbf) indicating whether a syntax element related to transform of the current block is obtained from the bitstream.

Advantageous Effects

According to an embodiment of the present disclosure, coding efficiency of a video signal can be improved.

BRIEF DESCRIPTION OF THE DRAWINGS

FIG. 8 is a diagram specifically illustrating a method for transforming a residual signal by an encoder.

FIG. 9 is a diagram specifically illustrating a method for obtaining a residual signal by inverse transforming a transform coefficient by an encoder and a decoder.

FIG. 10 illustrates a coding unit syntax structure according to an embodiment of the present disclosure.

FIG. 11 illustrates contents related to a syntax element indicating a prediction mode from among semantics for a coding unit according to an embodiment of the present disclosure.

FIG. 12 illustrates contents related to a syntax element indicating a prediction mode from among semantics for a coding unit according to another embodiment of the present disclosure.

FIG. 13 illustrates contents related to a syntax element indicating whether a syntax structure related to transform exists among semantics for a coding unit according to an embodiment of the present disclosure.

FIG. 14 illustrates a coding unit syntax structure according to another embodiment of the present disclosure.

FIG. 15 illustrates a method of signaling and parsing a syntax element indicating whether a syntax structure related to transform exists in existing technologies.

FIG. 16 illustrates an improved method of signaling and parsing the syntax element indicating whether the syntax structure related to the transform exists, described in FIG. 15.

BEST MODE FOR CARRYING OUT THE INVENTION

Figure 1:
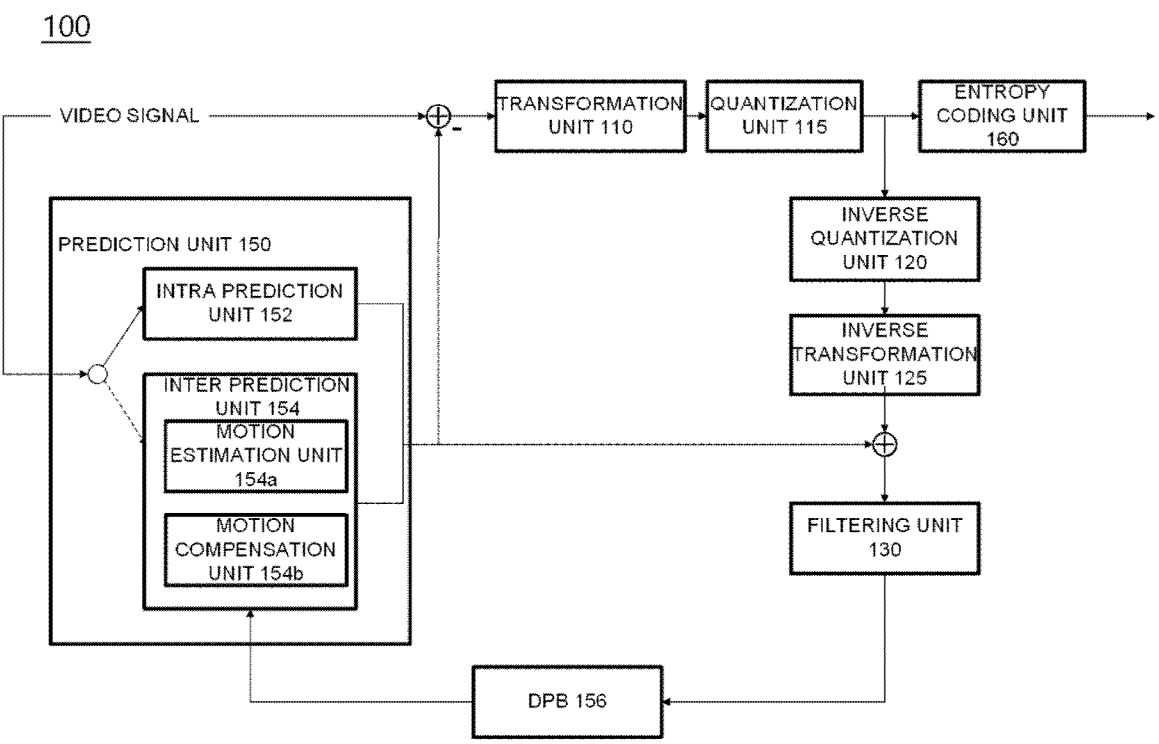
FIG. 1 is a schematic block diagram of a video signal encoding apparatus according to an embodiment of the present invention.

In order to solve the above problems, the present disclosure provides a video signal processing device and a video signal processing method as follows.

According to an embodiment of the present disclosure, a video signal processing method is provided, the method including: obtaining, from a bitstream, a skip parameter (cu_skip_flag) indicating whether a skip mode is applied to a current block; when the skip parameter indicates that a mode is not the skip mode, obtaining, from the bitstream, a merge parameter (merge_flag) indicating whether the current block is coded with a merge mode; and determining whether a CBF parameter (cu_cbf), which indicates whether a syntax element related to transform is obtained from the bitstream, is obtained, according to a value of the merge parameter.

The skip parameter is obtained from the bitstream when a prediction mode of the current block is not an intra mode, and the skip parameter may indicate whether a skip mode is applied, wherein the skip mode indicates that data other than a preconfigured parameter is not obtained from the bitstream.

When the value of the merge parameter indicates the merge mode, the CBF parameter may not be obtained from the bitstream and may be determined to be a preconfigured value.

When the skip parameter indicates that a mode is the skip mode, the merge parameter may be determined to be a value indicating the merge mode.

When the skip parameter indicates the skip mode, the CBF parameter may be determined to be a value indicating that the syntax element related to transform is not obtained from the bitstream.

When the skip parameter does not indicate the skip mode, the CBF parameter may be determined to be a value indicating that the syntax element related to transform is obtained from the bitstream.

The video signal processing method may further include: when the skip parameter indicates that a mode is not the skip mode, obtaining, from the bitstream, a prediction mode parameter (pred_mode_flag) indicating a prediction mode of the current block; and determining the prediction mode of the current block according to a value of the prediction mode parameter.

When the prediction mode of the current block is not an intra prediction mode, and if a value of the merge parameter does not indicate the merge mode, the CBF parameter is obtained from the bitstream.

According to an embodiment of the present disclosure, a video signal processing method is provided, the method including: generating a skip parameter (cu_skip_flag) indicating whether a skip mode is applied to a current block; generating a merge parameter (merge_flag) indicating whether the current block is coded with a merge mode; generating a CBF parameter (cu_cbf) indicating whether a syntax element related to transform of the current block is obtained from a bitstream; and generating a bitstream including at least one of the skip parameter, the merge parameter, and the CBF parameter, wherein whether the CBF parameter is included in the bitstream is determined according to a value of the merge parameter, and when the value of the merge parameter indicates the merge mode, the CBF parameter is not included in the bitstream.

The skip parameter, the merge parameter, and the CBF parameter are generated when the prediction mode of the current block is not an intra mode, and the skip parameter may indicate whether a skip mode is applied, wherein the skip mode indicates that data other than a preconfigured parameter is not obtained from the bitstream.

When the skip parameter indicates that a mode is the skip mode, the merge parameter may not be included in the bitstream.

When the prediction mode of the current block is not an intra prediction mode, and when a value of the merge parameter does not indicate the merge mode, the CBF parameter may be included in the bitstream.

According to an embodiment of the present disclosure, a video signal processing device includes a processor, and the processor is configured to: obtain, from a bitstream, a skip parameter (cu_skip_flag) indicating whether a skip mode is applied to a current block, when the skip parameter indicates that a mode is not the skip mode, obtains, from the bitstream, a merge parameter (merge_flag) indicating whether the current is encoded in a merge mode, and determine whether a CBF parameter (cu_cbf), which indicates whether a syntax element related to transform is obtained from the bitstream, is obtained, according to a value of the merge parameter, wherein, when the value of the merge parameter indicates the merge mode, the CBF parameter is not obtained from the bitstream, and is determined to be a preconfigured value.

The skip parameter is obtained from the bitstream when a prediction mode of the current block is not an intra mode, and the skip parameter may indicate whether a skip mode is applied, wherein the skip mode indicates that data other than a preconfigured parameter is not obtained from the bitstream.

When the skip parameter indicates that a mode is the skip mode, the merge parameter may be determined to be a value indicating the merge mode.

When the skip parameter indicates the skip mode, the CBF parameter may be determined to be a value indicating that the syntax element related to transform is not obtained from the bitstream.

When the skip parameter does not indicate the skip mode, the CBF parameter may be determined to be a value indicating that the syntax element related to transform is obtained from the bitstream.

The processor is configured to: when the skip parameter indicates that a mode is not the skip mode, obtain, from the bitstream, a prediction mode parameter (pred_mode_flag) indicating the prediction mode of the current block, and determine the prediction mode of the current block according to a value of the predication mode parameter, wherein, when the prediction mode of the current block is not an intra prediction mode, and when a value of the merge parameter does not indicate the merge mode, the CBF parameter is obtained from the bitstream.

According to an embodiment of the present disclosure, a video signal processing device includes a processor, and the processor is configured to: generate a skip parameter (cu_skip_flag) indicating whether a skip mode is applied to a current block, generate a merge parameter (merge_flag) indicating whether the current block is coded in a merge mode, generate a CBF parameter (cu_cbf) indicating whether a syntax element related to transform of the current block is obtained from a bitstream, and generate a bitstream including at least one of the skip parameter, the merge parameter, and the CBF parameter, wherein whether the CBF parameter is included in the bitstream is determined according to a value of the merge parameter, and when the value of the merge parameter indicates the merge mode, the CBF parameter is not included in the bitstream.

The skip parameter, the merge parameter, and the CBF parameter are generated when the prediction mode of the current block is not an intra mode, and the skip parameter may indicate whether a skip mode is applied, wherein the skip mode indicates that data other than a preconfigured parameter is not obtained from the bitstream.

When the skip parameter indicates that a mode is the skip mode, the merge parameter may not be included in the bitstream.

When the prediction mode of the current block is not an intra prediction mode, and when a value of the merge parameter does not indicate the merge mode, the CBF parameter may be included in the bitstream.

An embodiment of the present disclosure provides a non-transitory computer-readable recording medium in which a bitstream for video signal processing is stored, wherein the bitstream: includes a skip parameter (cu_skip_flag) indicating whether a skip mode is applied to a current block; when the skip parameter indicates that a mode is not the skip mode, further includes a merge parameter (merge_flag) indicating whether the current block is coded with a merge mode; and when a prediction mode of the current block is not an intra prediction mode and when a value of the merge parameter does not indicate the merge mode, further includes a CBF parameter (cu_cbf) indicating whether a syntax element related to transform of the current block is obtained from the bitstream.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154*a* and a motion compensation unit 154*b*. The motion estimation unit 154*a* obtains a motion vector value of the current region by referring to a specific reconstructed region. The motion estimation unit 154*a* transfers location information (reference frame, motion vector, etc.) of the reference region to the entropy coding unit 160 so as to enable the location information to be included in a bitstream. The motion compensation unit 154*b* performs inter motion compensation by using the motion vector value transferred from the motion estimation unit 154*a*.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154*a* and the motion compensation unit 154*b*. The motion estimation unit 154*a* obtains a motion vector value of the current region by referring to a specific region of the reconstructed reference picture. The motion estimation unit 154*a* transfers a motion information set (reference picture index, motion vector information, etc.) for the reference region to the entropy coding unit 160. The motion compensation unit 154*b* performs motion compensation by using the motion vector value transferred from the motion estimation unit 154*a*. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
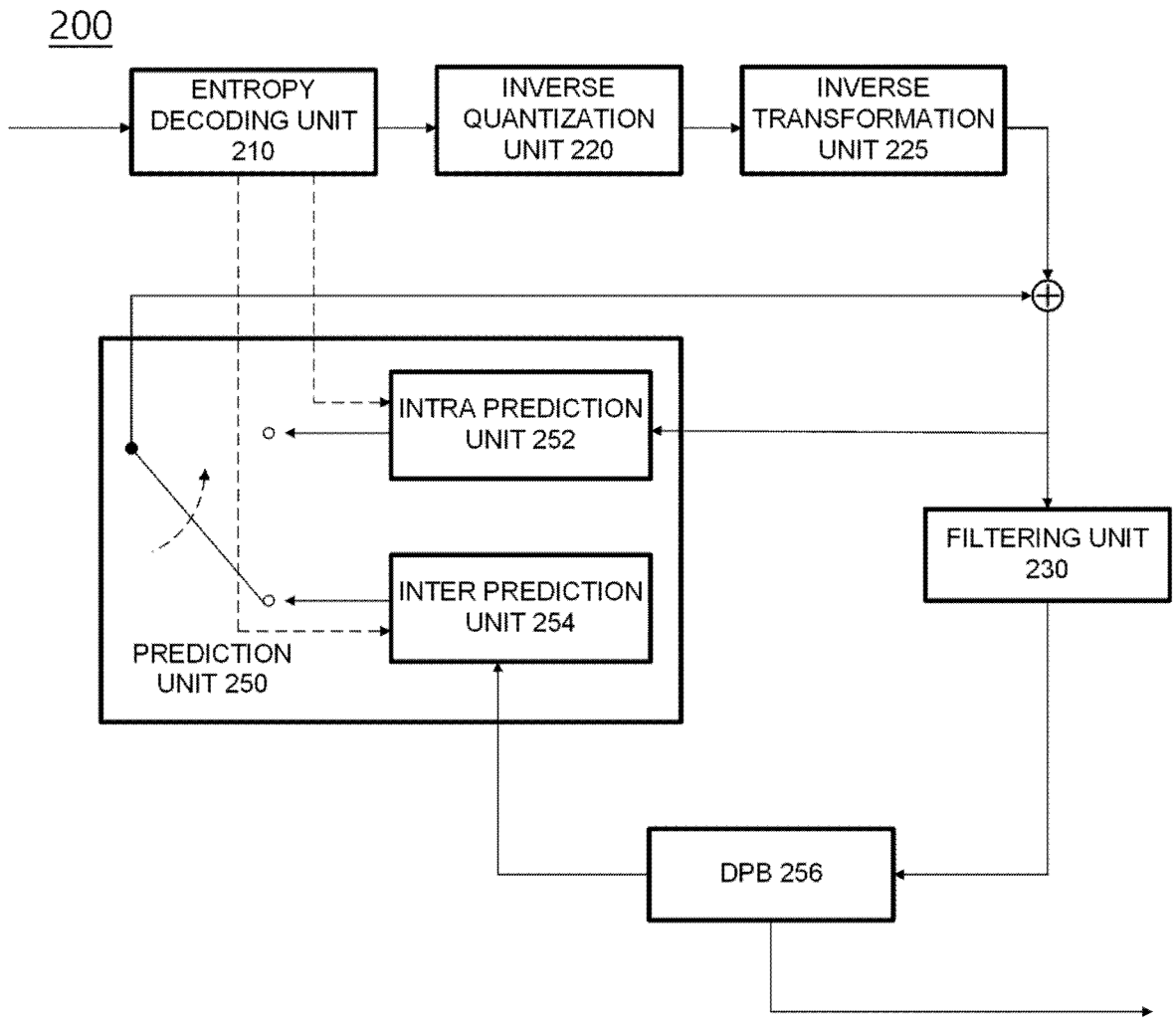
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an inter-polated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
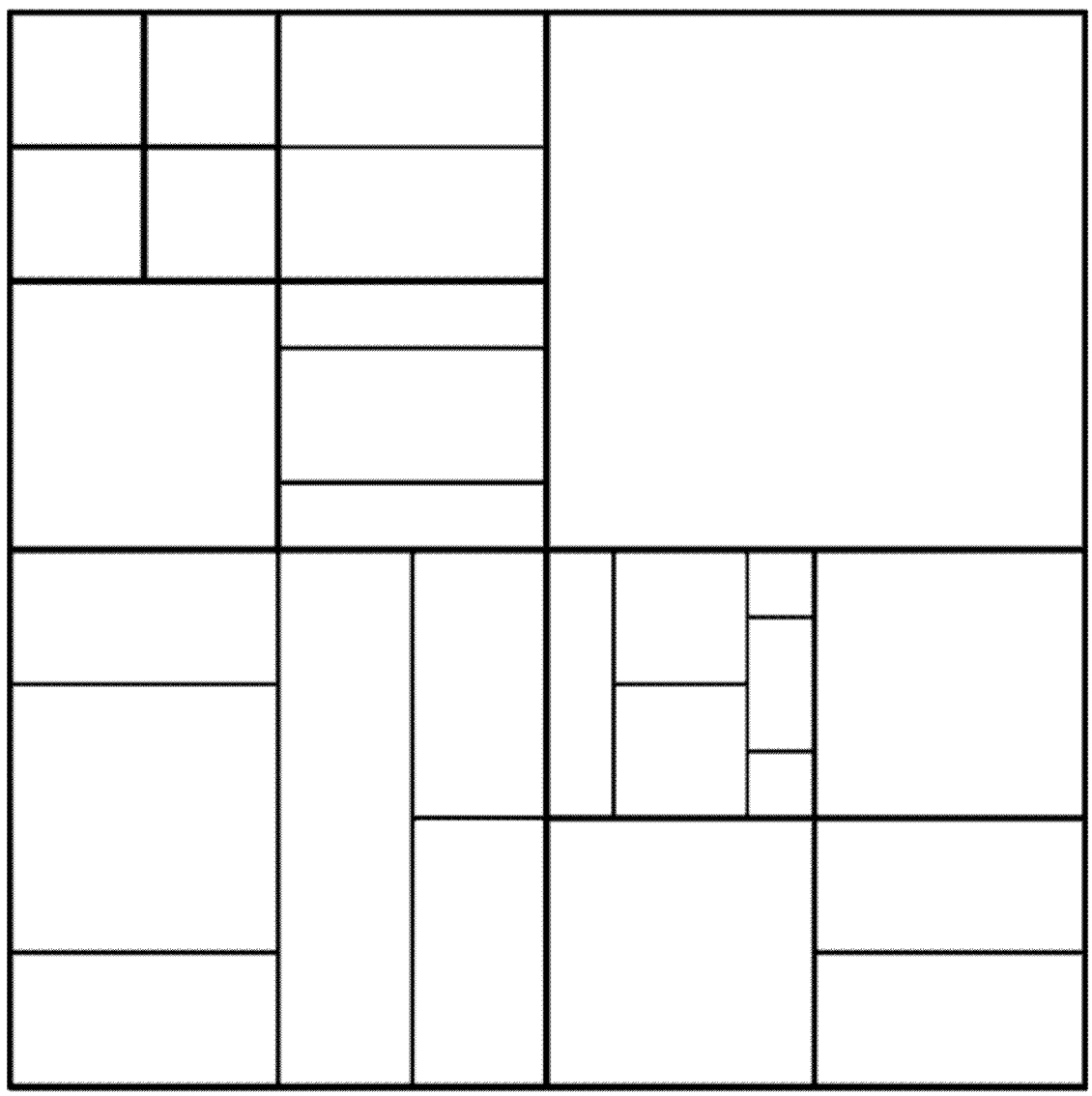
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
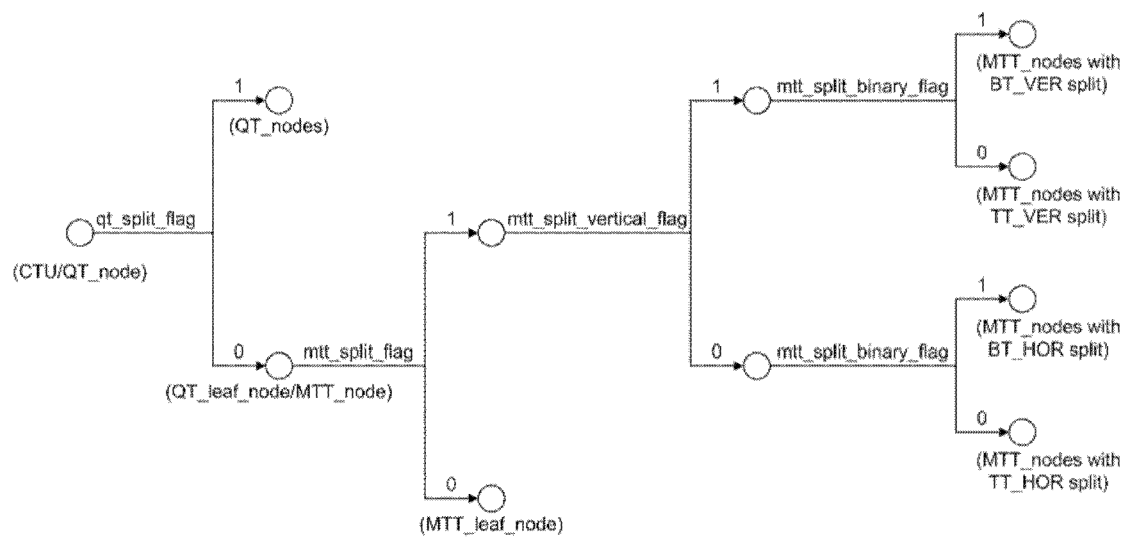
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT leaf node' of the quad tree.

Each quad tree leaf node 'QT leaf node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT leaf node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
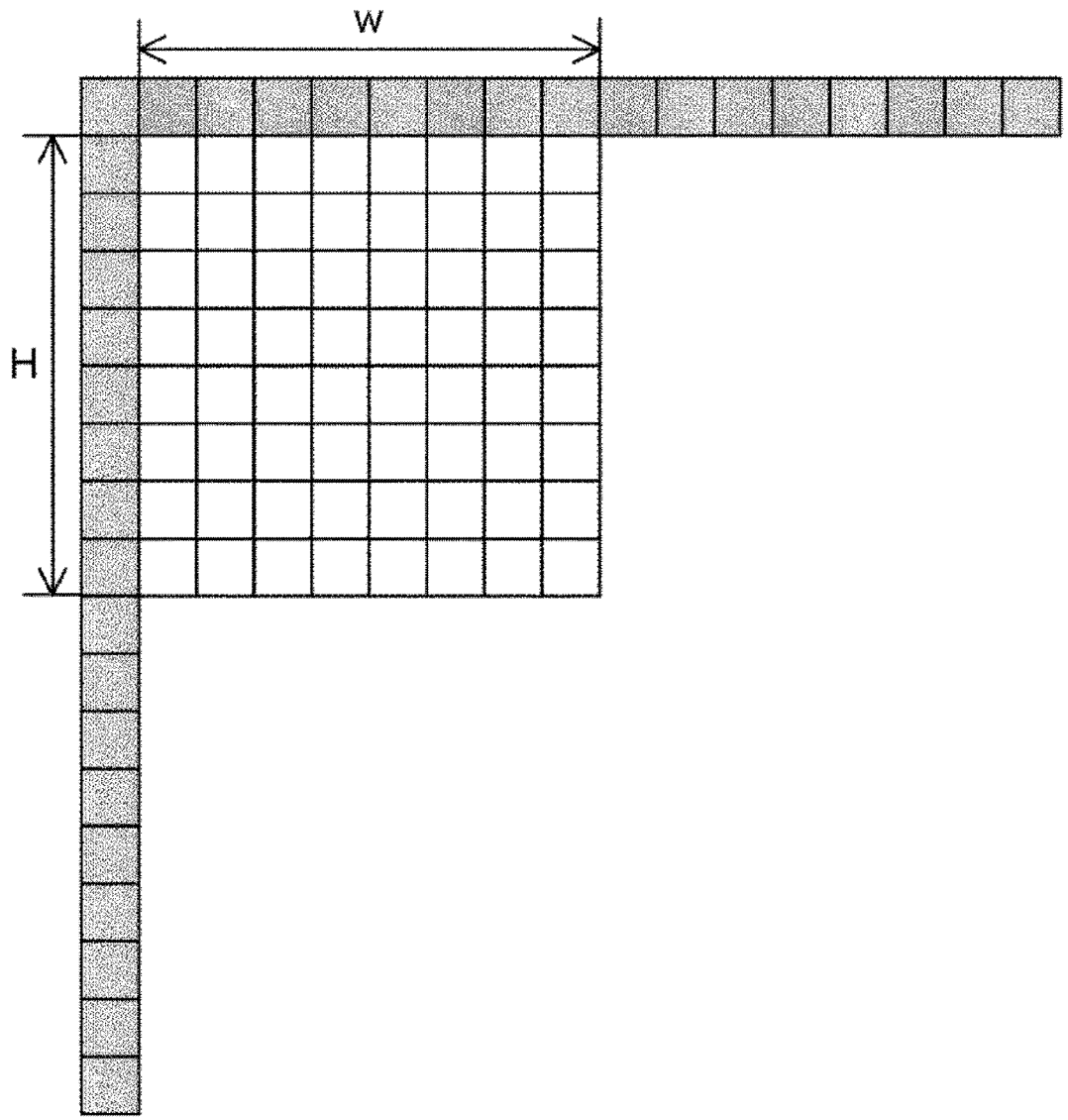
FIGS. 5 and 6 illustrate an intra-prediction method in more detail according to an embodiment of the present disclosure.
Figure 6:
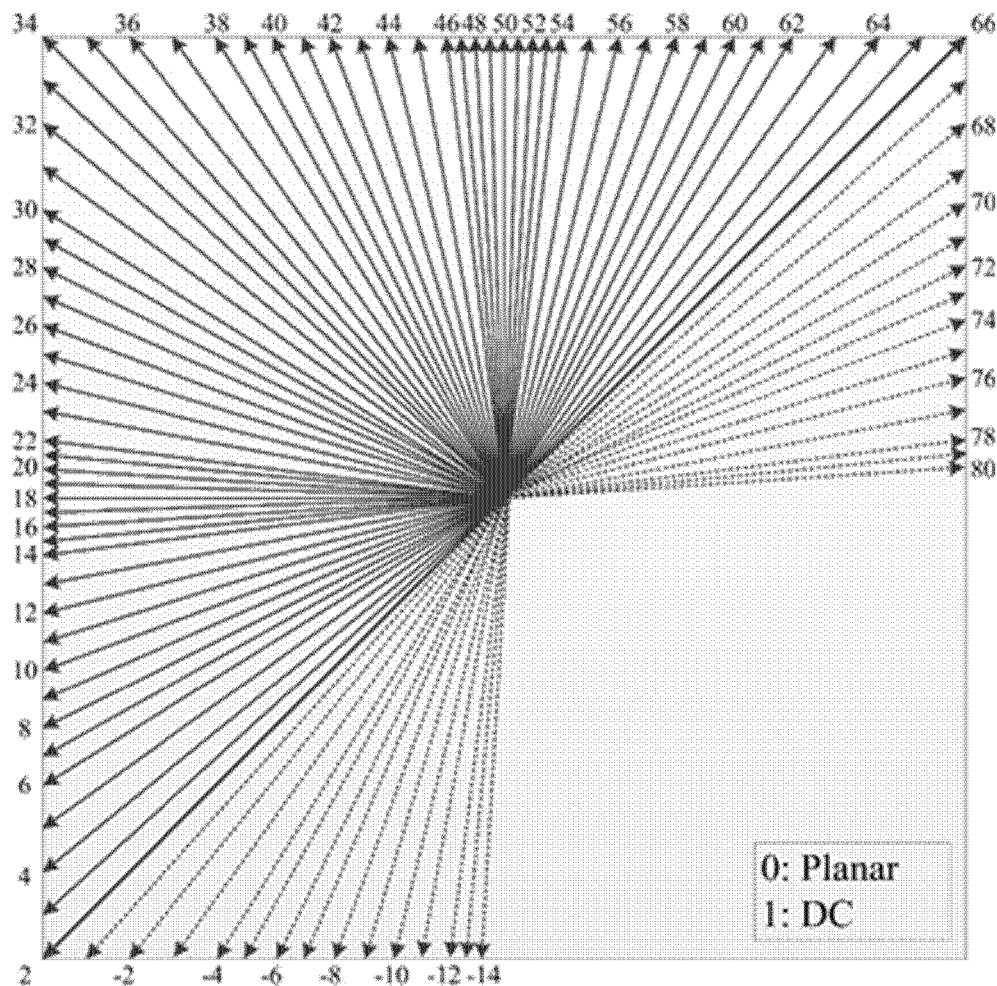

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

According to an additional embodiment of disclosure, pixels of multiple reference lines may be used for intra prediction of a current block. The multiple reference lines may include n lines located within a preconfigured range from the current block. According to an embodiment, when pixels of the multiple reference lines are used for intra prediction, separate index information indicating lines to be configured as reference pixels may be signaled.

When at least some samples to be used as reference samples have not yet been restored, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range may be set differently according to the shape of the current block. For example, when the current block is a rectangular block, a wide angle mode indicating an angle greater than 45 degrees or less than −135 degrees in the clockwise direction may be additionally used. When the current block is a horizontal block, the angle mode may indicate an angle within an angle range (i.e., a second angle range) between (45+offset1) degrees and (−135+offset1) degrees clockwise. In this case, angle modes 67 to 76 outside the first angle range may be additionally used. Also, when the current block is a vertical block, the angle mode may indicate an angle within an angle range (i.e., a third angle range) between (45−offset2) degrees and (−135−offset2) degrees clockwise. In this case, angle modes −10 to −1 outside the first angle range may be additionally used. According to an embodiment of the present invention, the values of offset1 and offset2 may be determined differently according to the ratio between the width and height of the rectangular block. Also, offset1 and offset2 may be positive numbers.

According to a further embodiment of the present invention, the plurality of angle modes included in the intra prediction mode set may include a basic angle mode and an extended angle mode. In this case, the extended angle mode may be determined based on the basic angle mode.

According to an embodiment, the basic angle mode is a mode corresponding to an angle used in intra prediction of an existing High Efficiency Video Coding (HEVC) standard, and the extended angle mode may be a mode corresponding to a newly added angle in intra prediction of the next generation video codec standard. More specifically, the basic angle mode is an angle mode corresponding to any one of intra prediction modes $\{2, 4, 6, \ldots, 66\}$ and the extended angle mode is an angle mode corresponding to any one of intra prediction modes $\{3, 5, 7, \ldots, 65\}$. That is, the extended angle mode may be an angle mode between basic angle modes within the first angle range. Accordingly, the angle indicated by the extended angle mode may be determined based on the angle indicated by the basic angle mode.

According to another embodiment, the basic angle mode may be a mode corresponding to an angle within a preset first angle range, and the extended angle mode may be a wide angle mode outside the first angle range. That is, the basic angle mode is an angle mode corresponding to any one of intra prediction modes $\{2, 3, 4, \ldots, 66\}$ and the extended angle mode is an angle mode corresponding to any one of intra prediction modes among $\{-10, -9, \ldots, -1\}$ and $\{67, 68, \ldots, 76\}$. The angle indicated by the extended angle mode may be determined as an angle opposite to the angle indicated by the corresponding basic angle mode. Accordingly, the angle indicated by the extended angle mode may be determined based on the angle indicated by the basic angle mode. Meanwhile, the number of extended angle modes is not limited to this, and additional extension angles may be defined according to the size and/or shape of the current block. For example, the extended angle mode may be defined as an angle mode corresponding to any one of intra prediction modes {−14, −13, . . . , −1} and {67, 68, . . . , 80}. Meanwhile, the total number of intra prediction modes included in the intra prediction mode set may vary depending on the configuration of the basic angle mode and extended angle mode described above.

In the above embodiments, the interval between the extended angle modes can be set based on the interval between the corresponding basic angle modes. For example, the interval between extended angle modes {3, 5, 7, . . . , 65} may be determined based on the interval between corresponding basic angle modes {2, 4, 6, . . . , 66}. For example, the interval between extended angle modes {−10, −9, . . . , −1} may be determined based on the interval between corresponding opposite-side basic angle modes {56, 57, . . . , 65}, and the interval between extended angle modes {67, 68, . . . , 76} may be determined based on the interval between corresponding opposite-side basic angle modes {3, 4, . . . , 12}. The angle interval between the extended angle modes can be configured to be the same as the angle interval between the corresponding basic angle modes. Also, the number of extended angle modes in the intra prediction mode set may be configured to be less than or equal to the number of basic angle modes.

According to an embodiment of the present invention, the extended angle mode may be signaled based on the basic angle mode. For example, the wide angle mode (i.e., extended angle mode) may replace at least one angle mode (i.e., basic angle mode) within the first angle range. The basic angle mode to be replaced may be an angle mode corresponding to the opposite side of the wide angle mode. That is, the basic angle mode to be replaced is an angle mode corresponding to an angle in the opposite direction of the angle indicated by the wide angle mode or an angle different from the angle in the opposite direction by a preset offset index. According to an embodiment of the present invention, the preset offset index is 1. The intra prediction mode index corresponding to the replaced basic angle mode may be mapped back to the wide angle mode to signal the wide angle mode. For example, the wide angle mode {−10, −9, . . . , −1} may be signaled by an intra prediction mode index {57, 58, . . . , 66}, and the wide angle mode {67, 68, . . . , 76} may be signaled by an intra prediction mode index {2, 3, . . . , 11}. In this way, as the intra prediction mode index for the basic angle mode signals the extended angle mode, even if the configuration of angle modes used for intra prediction of each block is different, the same set of intra prediction mode indexes can be used for signaling of the intra prediction mode. Accordingly, signaling overhead due to changes in intra prediction mode configuration can be minimized.

Meanwhile, whether to use the extended angle mode may be determined based on at least one of the shape and size of the current block. According to an embodiment, when the size of the current block is larger than a preset size, the extended angle mode may be used for intra prediction of the current block, and otherwise, only the basic angle mode may be used for intra prediction of the current block. According to another embodiment, when the current block is a block other than a square, the extended angle mode can be used for intra prediction of the current block, and when the current block is a square block, only the basic angle mode can be used for intra prediction of the current block.

The intra prediction unit determines reference pixels and/or interpolated reference pixels to be used for intra prediction of the current block based on the intra prediction mode information of the current block. When the intra prediction mode index indicates a specific angular mode, a reference pixel or an interpolated reference pixel corresponding to the specific angle from the current pixel of the current block is used for prediction of the current pixel. Accordingly, different sets of reference pixels and/or interpolated reference pixels may be used for intra prediction according to the intra prediction mode. After intra prediction of the current block is performed using the reference pixels and the intra prediction mode information, the decoder restores pixel values of the current block by adding the residual signal of the current block obtained from the inverse transform unit to the intra prediction value of the current block.

Hereinafter, an inter prediction method according to an embodiment of the present disclosure is described with reference to FIG. 7. In the present disclosure, the inter prediction method may include a general inter prediction method optimized for translation motion and an inter prediction method based on an affine model. Further, the motion vector may include at least one of a general motion vector for motion compensation according to the general inter prediction method and a control point motion vector for affine compensation.

Figure 7:
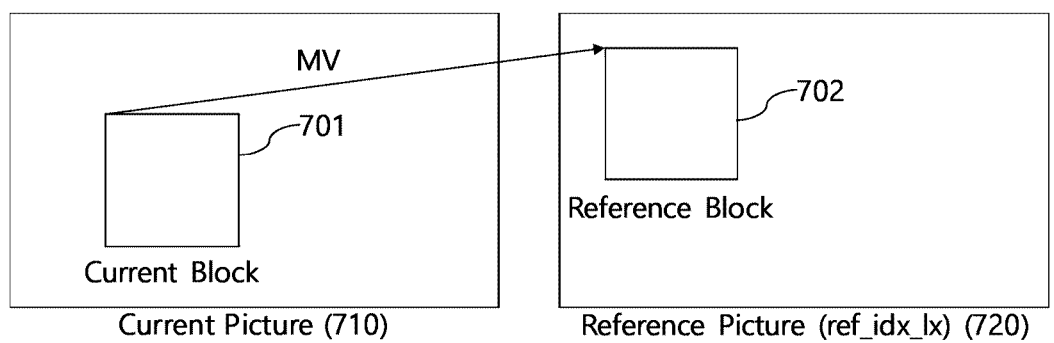
FIG. 7 illustrates an inter prediction method according to an embodiment of the present disclosure.

FIG. 7 illustrates an inter prediction method according to an embodiment of the present disclosure. As described above, the decoder may predict the current block with reference to reconstructed samples of another decoded picture. Referring to FIG. 7, the decoder acquires a reference block 702 within a reference picture 720 on the basis of a motion information set of a current block 701. In this case, the motion information set may include a reference picture index and a motion vector (MV). The reference picture index indicates a reference picture 720 including a reference block for inter prediction of the current block in a reference picture list. According to an embodiment, the reference picture list may include at least one of the L0 picture list or the L1 picture list. The motion vector indicates an offset between a coordinate value of the current block 701 within the current picture 710 and a coordinate value of the reference block 702 within the reference picture 720. The decoder acquires a predictor of the current block 701 on the basis of sample values of the reference block 702 and reconstructs the current block 701 using the predictor.

Specifically, the encoder may acquire the reference block by searching for blocks similar to the current block in pictures having a higher restoration sequence. For example, the encoder may search for a reference block having a minimum sum of differences in sample values from the current block within a preset search area. In this case, in order to measure similarity between the current block and samples of the reference block, at least one of Sum of Absolute Difference (SAD) and Sum of Hadamard Transformed Difference (SATD) may be used. Here, the SAD may be a value obtained by adding all of absolute values of differences in sample values included in two blocks. Further, the SATD may be a value obtained by adding all of absolute values of Hadamard transform coefficients acquired through Hadamard transform of differences in sample values included in two blocks.

Meanwhile, the current block may be predicted using one or more reference areas. As described above, the current block may be inter-predicted through a pair prediction method using two or more reference areas. According to an embodiment, the decoder may acquire two reference blocks on the basis of two motion information sets of the current block. Further, the decoder may acquire a first predictor and a second predictor of the current block on the basis of sample values of the two acquired reference blocks. In addition, the decoder may reconstruct the current block using the first predictor and the second predictor. For example, the decoder may reconstruct the current block on the basis of an average for each of the samples of the first predictor and the second predictor.

As described above, for motion compensation of the current block, one or more motion information sets may be signaled. In this case, similarity between motion information sets for motion compensation of each of a plurality of blocks may be used. For example, the motion information set used for predicting the current block may be induced from motion information sets used for predicting one of other reconstructed samples. To this end, the encoder and the decoder may reduce signaling overhead.

For example, there may be a plurality of candidate blocks that are likely to have been predicted on the basis of a motion information set which is the same as or similar to the motion information set of the current block. The decoder may generate a merge candidate list on the basis of the plurality of candidate blocks. Here, the merge candidate list may include candidates corresponding to samples that are likely to have been predicted on the basis of a motion information set related to the motion information set of the current block, among samples reconstructed earlier than the current block. The encoder and the decoder may configure the merge candidate list of the current block according to a predefined rule. Here, the merge candidate lists respectively configured by the encoder and the decoder may be the same. For example, the encoder and the decoder may configure the merge candidate list of the current block on the basis of a location of the current block in a current picture.

A method for the encoder and the decoder to configure the merge candidate list of the current block will be described. In the present disclosure, the location of a specific block indicates a relative location of a top-left sample of the specific block in a picture including the specific block.

When performing prediction, the encoder and the decoder may refer to a neighbor location the current block. This may refer to motion information corresponding to a neighbor location the current block. For example, when a merge mode or an advanced motion vector prediction (AMVP) mode is used, it is possible to set a motion vector (MVP) or motion vector (MV) based on motion information corresponding to a location around the current block. The neighbor location may be predetermined. In addition, when there are a plurality of the neighbor location, an order of referencing them may be predetermined. Also, the neighbor location may include a spatial neighbor and a temporal neighbor.

Locations corresponding to A0, A1, B0, B1, and B2 may be predetermined. Also, the location in here may be a luma position. When a top-left location of the current block is (xCb, yCb), A0, A1, B0, B1, B2 may be (xCb−1, yCb+cbHeight), (xCb−1, yCb+cbHeight −1), (xCb+cbWidth, yCb−1), (xCb+cbWidth−1, yCb−1), (xCb−1, yCb−1), respectively. In this case, cbWidth, cbHeight may be a width and a height of a current block, respectively.

According to an embodiment of the present invention, in the merge mode, spatial neighbors may be referred in the order of A1, B1, B0, A0, and B2. Also, a spatial candidate corresponding to a spatial neighbor may be added to a candidate list. Also, a temporal candidate may be added in addition to the spatial candidate, which may be behind the spatial candidate. Also, a motion vector corresponding to the spatial candidate may be called a collocated motion vector.

In addition, when the candidate list in not filed, a zero motion vector may be added to a candidate list. The zero motion vector may be a motion vector indicating the current block location.

In addition, the merge candidate list may include a history-based motion vector prediction candidate, a pairwise average candidate, and the like. It is possible to place it behind a spatial candidate in a candidate list. The history-based motion vector prediction candidate may be stored motion information. In addition, the stored motion information may be motion information corresponding to a block decoded (or encoded) before the current block. In addition, the pairwise average candidate may be a candidate generated based on candidates already added to the candidate list. For example, the pairwise average candidate may be an average of the candidates already added to the candidate list.

Motion vector scaling process may be included in the process of adding to the candidate list by referring to the neighbor location the current block described above. Motion vector scaling may be performed based on a picture order count (POC) of the referenced motion vector, a POC of a picture including a current block, a POC of a reference picture of the current block, and referenced motion information.

Meanwhile, in order to improve coding efficiency, a method of quantizing a transform coefficient value obtained by transforming a residual signal and the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

FIG. 8 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transform of the residual signal, such as transform matrix, transform array, transform function, and transform. According to an embodiment, the transform kernel may be any one of a plurality of available kernels. A transform kernel based on different transform types may be used for each of the vertical transform and the horizontal transform.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 8, the above-described transform method may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether to perform secondary transform may be determined depending on the size of the current block or the size of the residual block. Transform kernels having different sizes may be used depending on the size of the current block or the size of the residual block. For example, 8×8 secondary transform may be applied to a block in which a length of a shorter side between a width or a height is shorter than a first preconfigured length. Further, 4×4 secondary transform may be applied to a block in which the length of the shorter side between the width or the height is longer than a second preconfigured length. Here, the first preconfigured length may be a value larger than the second preconfigured length, but the present disclosure is not limited thereto. Unlike primary transform, secondary transform may not be performed separately into vertical transform and horizontal transform. This secondary transform may be referred to as a low frequency band non-separable transform (low frequency non-separable transform, LFNST).

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may be unnecessarily increased. Accordingly, transform on the residual signal of the specific region may be omitted. Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 8 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

FIG. 9 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both the primary inverse transform and the secondary inverse transform described above regarding the transform block may be omitted. The inverse quantized transform coefficient may be used as a residual signal. For example, the decoder may reconstruct a current block by using the inverse quantized transform coefficient as a residual signal.

According to another embodiment, the transform-related syntax element for the specific transform block may not indicate a transform skip. In this case, the inverse transform unit may determine whether to perform secondary inverse transform for secondary transform. For example, when the transform block is a transform block of an intra-predicted block, secondary inverse transform may be performed on the transform block. A secondary transform kernel used for the transform block may be determined based on an intra prediction mode corresponding to the transform block. As another example, whether to perform secondary inverse transform may be determined based on the size of the transform block. Secondary inverse transform may be performed after inverse quantization and before primary inverse transform.

The inverse transform unit may perform primary inverse transform on the inverse quantized transform coefficient or a secondary inverse transformed transform coefficient. In the case of primary inverse transform, vertical transform and horizontal transform may be performed separately as in the case of primary transform. For example, the inverse transform unit may obtain a residual block by performing vertical inverse transform and horizontal inverse transform on the transform block. The inverse transform unit may inverse transform the transform block on the basis of the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

As described in FIG. 3 and FIG. 4, a leaf node of a multi-type tree may be a coding unit, and a structure of a coding unit syntax and a method of processing the same will be described in FIG. 10 to FIG. 14.

FIG. 10 is a diagram illustrating a syntax structure of a coding unit. In a syntax table of FIG. 10, elements indicated in bold letters indicate syntax elements included in a bitstream, and a second column in the syntax table of FIG. 10 indicates a syntax element encoding method. For example, ae (v) indicates that a corresponding syntax element is coded using a context-based adaptive arithmetic entropy coding method.

Coding_unit( ) is a syntax structure for a coding unit, and receives upper left coordinates (x0, y0) of a block, a width cbWidth of the block, a height cbHeight of the block, and a treeType variable indicating a type of a currently processed coding tree. The name of the treeType variable may be changed as needed.

In general, since a correlation exists between a luma component and a chroma component in an image, a luma component block and a chroma component block may be coded with the same coding tree. On the other hand, in order to improve coding efficiency for the chroma component, the luma component and the chroma component may be coded with different coding trees. A 1-bit flag indicating that the luma component and the chroma component are coded with different coding trees may be signaled to at least one of higher level syntaxes, such as PPS, SPS, and VPS. Alternatively, the 1-bit flag indicating that the luma component and the chroma component may be coded with different coding trees may be signaled to at least one of the higher level syntaxes, such as PPS, SPS, and VPS, and it may be indicated that the luma component and the chroma component have been coded with different coding trees in a coding tree unit or at a coding unit level. If treeType is SINGLE_TREE, this indicates that the luma component and the chroma component are coded with the same coding tree. In this case, a coding unit may include a luma component coding block and a chroma component coding block. If treeType is DUAL_TREE_LUMA, this indicates that the luma component and the chroma component are coded with two different coding trees, and a currently processed component is the luma component. In this case, the coding unit includes only the luma component. If treeType is DUAL_TREE_CHROMA, this indicates that the luma component and the chroma component are coded with two different coding trees, and a currently processed component is the chroma component. In this case, the coding unit includes only the chroma component.

A prediction method of a corresponding block may be determined in a coding unit, and the prediction method may be largely divided into intra prediction and inter prediction. Additionally, intra BC prediction may be used as described above in FIG. 1 and FIG. 2. The prediction method of the current coding unit may be determined by a slice type (or tile type) and a syntax element indicating a prediction mode.

In a first conditional statement (if syntax, 1010) of FIG. 10, if a variable (slice_type) indicating a slice type, to which the current coding unit belongs, is I, this indicates, in an embodiment, that all blocks present in the slice are coded by intra prediction, and therefore a prediction mode of the current coding unit may be determined to be an intra prediction mode without parsing a syntax element indicating the prediction mode.

In the first conditional statement (if syntax, 1010) of FIG. 10, if the variable (slice_type) indicating a slice type, to which the current coding unit belongs, is I, this indicates, in another embodiment, that all blocks present in the slice are coded by intra prediction or BC prediction, and therefore the prediction mode of the current coding unit may be determined to be the intra prediction mode without parsing the syntax element indicating the prediction mode.

In another embodiment, in the first conditional statement (if syntax, 1010) of FIG. 10, if the variable (slice_type) indicating the slice type, to which the current coding unit belongs, is not I, and a value of sps_bc_enabled_flag is 1, cu_skip_flag and pred_mode_flag may be obtained from the bitstream. If the variable (slice_type) indicating the slice type, to which the current coding unit belongs, is I or the value of sps_bc_enabled_flag is 0, cu_skip_flag and pred_mode_flag may be determined to be preconfigured values.

Here, sps_bc_enabled_flag may be a higher level signaling indicating whether a block copy (BC) mode described below is used. For example, sps_bc_enabled_flag may be signaling in a sequence parameter set indicating whether the BC mode is used. If sps_bc_enabled_flag is configured to 0, it is possible that BC is not used, and if sps_bc_enabled_flag is configured to 1, the BC can be used. Here, if the BC mode is named as an intra block copy (IBC) mode, sps_bc_enabled_flag may be expressed as sps_ibc_enabled_flag.

Further, whether cu_skip_flag is obtained from the bitstream may be determined by further examining treeType, sps_bc_enabled_flag, and the size and the prediction mode of the current block.

For example, if treeType is DUAL_TREE_CHROMA, cu_skip_flag may not be obtained from the bitstream and may be determined to be a preconfigured value.

If treeType is not DUAL_TREE_CHROMA, the width and height of the current block are not 4, and if the prediction mode of the current block is not an intra mode, cu_skip_flag may be obtained from the bitstream. If the width and height of the current block are 4 or if the prediction mode of the current block is the intra mode, cu_skip_flag may not be obtained from the bitstream and may be determined to be the preconfigured value.

If treeType is not DUAL_TREE_CHROMA, the value of sps_bc_enabled_flag is 1, and if the width and height of the current block are smaller than 64, cu_skip_flag may be obtained from the bitstream. If the value of sps_bc_enabled_flag is 0 or if the width and height of the current block are not smaller than 64, cu_skip_flag may not be obtained from the bitstream and may be determined to be the predetermined value. Furthermore, whether pred_mode_flag is obtained from the bitstream may be determined according to cu_skip_flag, the slice type of the current block, the width and height of the current block, and the prediction mode of the current block.

For example, if cu_skip_flag is 0, the slice type to which the current block belongs is not slice I, the width and height of the current block are not 4, and a coding mode of the current block is MODE_TYPE_ALL, pred_mode_flag may be obtained from the bitstream, otherwise, pred_mode_flag may be determined to be a preconfigured value.

Here, MODE_TYPE_ALL indicates that any prediction mode may be applied to decoding of the current block. In more detail, MODE_TYPE_ALL indicates that no prediction mode is excluded in determination of the prediction mode of the current block.

If cu_skip_flag is not obtained from the bitstream, cu_skip_flag may be determined to be 0 that is a value indicating that the skip mode is not applied, as described above.

If pred_mode_flag is not obtained from the bitstream, and if the width and height of the current block are 4, pred_mode_flag may be determined to be 1. If the prediction mode of the current block is the intra mode, a value of pred_mode_flag may be determined to be 1. If the prediction mode of the current block is the inter mode, the value of pred_mode_flag may be determined to be 0. If the slice to which the current block belongs is slice I, pred_mode_flag may be determined to be 1, and if the slice to which the current block belongs is slice P or B, pred_mode_flag may be determined to be 0. Here, value 0 of pred_mode_flag may indicate that the current block has been coded with the inter prediction mode. Value 1 of pred_mode_flag may indicate that the current block has been coded with the intra prediction mode.

In the first conditional statement (if syntax, 1010) of FIG. 10, if the variable (slice_type) indicating the slice type, to which the current coding unit belongs, is not I, this indicates that blocks present in the slice may be coded with intra or inter prediction, and therefore the prediction mode of the current coding unit may be determined by parsing the syntax element indicating the prediction mode.

In the embodiment of FIG. 10, a case in which a picture is divided into a plurality of slices or coded into a single slice is described, but the present disclosure is not limited thereto, and the present disclosure is applied also when a picture is divided into a plurality of tiles or coded into a single tile. That is, when a picture is divided into a plurality of tiles or coded into a single tile, a prediction mode of a corresponding coding unit may be determined using a syntax element indicating a tile type and a prediction mode.

In inter prediction, similarity also exists between motion information of a neighboring block and motion information of a current block (e.g., a motion vector and a reference picture index). A merge mode of inter prediction corresponds to a method of configuring a merge candidate list including a plurality of motion information candidates, signaling an index within the list, and then expressing the motion information, wherein the motion information may be efficiently coded. Whether to apply the merge mode may be indicated by a 1-bit flag, and this flag is referred to as merge_flag in the present specification. The name of variable merge_flag may be changed as needed. In an embodiment, merge_flag may be referred to as general_merge_flag when there exist a plurality of flags, such as general_merge_flag indicating whether the current block is derived from a neighboring inter prediction partition, regular_merge_flag indicating whether a regular merge mode or a merge mode, in which a motion vector difference (MVD) is used to generate an inter prediction parameter of the current block, or mmvd_merge_flag indicating the merge mode in which the motion vector difference (MVD) is used to generate the inter prediction parameter of the current block.

merge_flag may be coded using an entropy coder, such as CABAC that considers context. A skip mode, which is a special case of the merge mode, corresponds to a case in which no residual signal exists after prediction to be the merge mode, and thus a block may be reconstructed without inverse transform and inverse quantization. Whether to apply the skip mode may be indicated by a 1-bit flag, and this flag is referred to as cu_skip_flag in this specification. The name of variable cu_skip_flag may be changed as needed. For example, the variable may be simply referred to as a skip parameter or skip_flag. cu_skip_flag may be coded using the entropy coder, such as CABAC that considers context. cu_skip_flag may be generated based on the bitstream if the prediction mode of the current block is not the intra mode. Further, cu_skip_flag may be obtained from the bitstream if the prediction mode of the current block is not the intra mode.

cu_skip_flag may indicate whether the skip mode is applied, wherein the skip mode indicates that data other than a preconfigured parameter is not obtained from the bitstream. More specifically, if the current block belongs to slice P or B, for data other than a merge_data( ) syntax structure including a syntax required for the merge mode and pred_mode_bc_flag[x0][y0] indicating whether the block copy (BC) mode is applied, a value of cu_skip_flag may be configured to 1 in order to indicate the skip mode that is not obtained from the bitstream.

Here, the BC mode indicates a signal processing mode in which: the current block is coded using data, which is coded before the current block and stored in a buffer, in the slice to which the current bock belongs, without referring to other reference pictures; or the current block is decoded using data, which is decoded before the current and stored in the buffer, in the slice to which the current bock belongs, without referring to other reference pictures. The BC mode may be referred to as an intra block copy (IBC) mode.

If the current block belongs to slice I, for data other than merge_idx[x0][y0] which is information necessary for the merge mode, a value of cu_skip_flag may be configured to 1 in order to indicate the skip mode that is not obtained from the bitstream.

Meanwhile, if the skip mode is not applied as described above, the value of cu_skip_flag may be configured to 0 in order to indicate the same.

In order to indicate the prediction mode of the coding unit, cu_skip_flag indicating whether the skip mode is applied may be signaled first. If cu_skip_flag[x0][y0] indicating whether the skip mode is applied at position (x0, y0) is 1, it may be indicated that the block, in which the position of an upper left luma component sample of the block is (x0, y0) on the basis of an upper left luma component sample of the picture, is coded with the skip mode among inter prediction methods.

In a second conditional statement (if syntax, 1020) of FIG. 10, if cu_skip_flag[x0][y0] is 0, a 1-bit flag indicating a prediction mode may be additionally parsed to determine a prediction method of a corresponding block, and this flag is referred to as pred_mode_flag in the present specification. The name of variable pred_mode_flag may be changed as needed. For example, the variable may be simply referred to as mode_flag. Alternatively, the variable may be referred to as general_pred_mode_flag in order to distinguish the variable from a flag indicating another prediction mode. Pred_mode_flag may be coded using the entropy coder, such as CABAC that considers context.

FIG. 11 illustrates contents related to pred_mode_flag, which is a syntax element indicating a prediction mode, among semantics for a coding unit. If pred_mode_flag is 0, this indicates that a current coding unit is coded with an inter prediction mode, and if pred_mode_flag is 1, this indicates that the current coding unit is coded with an intra prediction mode. Based on a value of pred_mode_flag, a value of variable CuPredMode[x][y] indicating the prediction mode of the current block may be configured according to the following conditions of i), ii), and iii). Here, x is from x0 to x0+cbWidth−1, and y is from y0 to y0+cbHeight−1.

i) If pred_mode_flag is 0, CuPredMode[x][y] may be configured to MODE_INTER.

ii) Otherwise (if pred_mode_flag is 1), CuPredMode[x][y] may be configured to MODE_INTRA.

iii) If pred_mode_flag does not exist (if not signaled), CuPredMode[x][y] may be configured to MODE_INTRA.

In conditions i), ii), and iii), MODE_INTER is a value indicating the inter prediction mode, and MODE_INTRA is a value indicating the intra prediction mode.

In the first conditional statement 1010 of FIG. 10, if a current slice is an I-type slice, this indicates that all blocks existing in the slice are coded using the intra prediction mode, so that a value of variable CuPredMode[x0][y0] may be determined to be MODE_INTRA according to condition iii) without parsing cu_skip_flag[x0][y0] and pred_mode_flag[x0][y0]. The skip mode cannot be used in slice I, in which only the intra prediction mode is allowed, and thus cu_skip_flag[x0][y0] may be configured to 0.

According to the conditions i), ii), and iii) described in FIG. 11, the value of the CuPredMode variable may be configured. Further, in a third conditional statement (if syntax, 1030) of FIG. 10, syntax elements necessary for the intra prediction mode and the inter prediction mode are parsed and processed according to the value of variable CuPredMode.

There is a problem in the method of configuring the value of variable CuPredMode on the basis of pred_mode_flag, described in FIG. 11. According to condition iii) of FIG. 11, if pred_mode_flag does not exist (if not signaled), CuPredMode[x][y] may be configured to MODE_INTRA. If cu_skip_flag[x0][y0] is 1, according to the second conditional statement 1020 of FIG. 10, pred_mode_flag is not signaled, and the value of CuPredMode[x][y] (x is from x0 to x0+cbWidth−1, and y is from y0 to y0+cbHeight−1) is configured to MODE_INTRA. Therefore, even if coding is performed with the skip mode, syntax parsing and processing related to intra prediction are performed in the third conditional statement (if syntax, 1030) of FIG. 10.

FIG. 12 illustrates contents related to pred_mode_flag among semantics for a coding unit for solving such a problem. If pred_mode_flag is 0, it indicates that a current coding unit is coded with an inter prediction mode, and if pred_mode_flag is 1, it indicates that the current coding unit is coded with an intra prediction mode. Based on a value of pred_mode_flag, a value of variable CuPredMode[x][y] may be configured according to the following conditions i), ii), iii), and iv). Here, x is from x0 to x0+cbWidth−1, and y is from y0 to y0+cbHeight−1.

i) If pred_mode_flag is 0, CuPredMode[x][y] may be configured to MODE_INTER.

ii) Otherwise (if pred_mode_flag is 1), CuPredMode[x][y] may be configured to MODE_INTRA.

If pred_mode_flag does not exist (if not signaled), CuPredMode[x][y] may be configured according to conditions iii) and iv), which is based on a value of cu_skip_flag[x0][y0].

iii) If cu_skip_flag[x0][y0] is 1, CuPredMode[x][y] may be configured to MODE_SKIP.

iv) Otherwise (if cu_skip_flag[x0][y0] is 0), CuPredMode[x][y] may be configured to MODE_INTRA.

In the conditions i), ii), iii), and iv), MODE_INTER is a value indicating the inter prediction mode, MODE_INTRA is a value indicating the intra prediction mode, and MODE_SKIP is a value indicating a skip mode among inter prediction modes. In condition iii), the skip mode is one of the inter prediction modes, and thus CuPredMode[x][y] may be configured to MODE_INTER, not MODE_SKIP.

A value of variable CuPredMode[x0][y0] may be configured according to the conditions i), ii), iii), and iv) described in FIG. 12, and parsing and processing of a syntax element may be performed according to a prediction method in the third conditional statement ("if" statement, 1030) and "else" statement of FIG. 10.

If CuPredMode[x0][y0] is MODE_INTRA in the third conditional statement (if syntax, 1030) of FIG. 10, this indicates that a block, in which the position of an upper left luma component sample of the block is (x0, y0) on the basis of an upper left luma component sample of the picture, is coded with intra prediction, and therefore parsing and processing of the syntax element necessary for intra prediction are performed. For example, determination of whether to apply intra pulse code modulation (IPCM), which is one of the intra prediction methods, may be included. IPCM is one of lossless compression methods in which prediction, transformation, quantization, and entropy coding may be bypassed, and pixel samples may be expressed with a predefined number of bits. Whether IPCM is applied may be indicated by a 1-bit flag, which is referred to as pcm_flag in the present specification. pcm_flag may be coded using an entropy coder, such as CABAC that considers context. In a fourth conditional statement (if syntax, 1040) of FIG. 10, whether to parse pcm_flag is determined, and if all of the following conditions i), ii), and iii) are satisfied, pcm_flag may be parsed.

i) A case where pcm_enabled_flag is 1: A 1-bit flag, which indicates whether IPCM can be used in at least one of high-level syntax, such as PPS, SPS, and VPS, may be included, and this flag is referred to as pcm_enabled_flag in the present specification. For example, when pcm_enabled_flag is included in a slice header (or tile header) and signaled, if pcm_enabled_flag is 1, the slice may use an IPCM mode.

ii) A case where the width (cbWidth) of the block is MinIpcmCbSizeY or greater, and the width (cbWidth) of the block is MaxIpcmCbSizeY or smaller: If pcm_enabled_flag is 1, two parameters of MinIpcmCbSizeY and MaxIpcmCbSizeY may be included, wherein MinIpcmCbSizeY and MaxIpcmCbSizeY indicate the size of the block in which IPCM may be applied to at least one of high-level syntax, such as PPS, SPS, and VPS. MinIpcmCbSizeY is a parameter indicating a minimum size condition of the block to which IPCM may be applied, and MaxIpcmCbSizeY is a parameter indicating a maximum size condition of the block to which IPCM may be applied. If the block width (cbWidth) is MinIpcmCbSizeY or greater, and the block width (cbWidth) is MaxIpcmCbSizeY or smaller, IPCM is may be applied to the corresponding block.

iii) A case where the block height (cbHeight) is MinIpcmCbSizeY or greater, and the block height (cbHeight) is MaxIpcmCbSizeY or smaller: As in the case of the width of the block, if the height (cbHeight) of the block is MinIpcmCbSizeY or greater and the height (cbHeight) of the block is MaxIpcmCbSizeY or smaller, IPCM may be applied to the block.

If all of the above-described conditions i), ii), and iii) are satisfied, whether to apply IPCM may be determined by parsing pcm_flag. If pcm_flag[x0][y0] is 1, this may indicate that IPCM is applied to the block, in which the position of the upper left luma component sample of the block is (x0, y0) based on the upper left luma component sample of the picture. If pcm_flag[x0][y0] does not exist (if not parsed), pcm_flag[x0][y0] may be configured to 0.

If CuPredMode[x0][y0] is not MODE_INTRA in the third conditional statement (1030) of FIG. 10, this indicates that a block, in which the position of the upper left luma component sample of the block is (x0, y0) on the basis of the upper left luma component sample of the picture, is coded with inter prediction, and thus parsing and processing of the syntax element necessary inter intra prediction are performed in "else" syntax of the third conditional statement 1030 of FIG. 10. If cu_skip_flag[x0][y0] is 1 in a fifth conditional statement 1050 of FIG. 10, this indicates that the block, in which the position of the upper left luma component sample of the block is (x0, y0) on the basis of the upper left luma component sample of the picture, is coded with the skip mode, and thus parsing and processing of the syntax element necessary for the skip mode are performed. On the other hand, if cu_skip_flag[x0][y0] is 0, merge_flag[x0][y0] may be parsed to determine whether the block is coded with the merge mode, not the skip mode. If merge_flag[x0][y0] is 1, this indicates that the block, in which the position of the upper left luma component sample of the block is (x0, y0) on the basis of the upper left luma component sample of the picture, is coded with the merge mode, and thus parsing and processing of the syntax element necessary for the merge mode are performed.

From the first conditional statement 1010 to the fifth conditional statement 1050 of FIG. 10, parsing and processing of the syntax elements necessary for determination and prediction of the prediction mode may be performed, and parsing and processing of the syntax elements related to a residual signal may be performed after a sixth conditional statement 1060 of FIG. 10.

In the sixth conditional statement 1060 of FIG. 10, if pcm_flag[x0][y0] is 0, this indicates that a prediction mode other than IPCM is applied to the corresponding block, and thus parsing and processing of the syntax elements related to the residual signal should be performed. On the other hand, if pcm_flag[x0][y0] is 1, this indicates that IPCM has been applied to the corresponding block, and thus a procedure related to the residual signal processing may be bypassed.

In a seventh conditional statement 1070 of FIG. 10, if CuPredMode[x0][y0] is not MODE_INTRA, and if cu_skip_flag[x0][y0] is 0, a syntax element of cu_cbf may be parsed, wherein cu_cbf indicates whether a transform_tree( ) syntax structure including a syntax element related to transform of the current block exists. The name of variable cu_cbf may be referred to as another form as necessary. For example, cu_cbf may be referred to as cu_cbf_flag. Cu_cbf may be coded using the entropy coder, such as CABAC that considers context.

FIG. 13 illustrates contents related to cu_cbf among semantics for a coding unit. If cu_cbf is 1, this indicates that a transform_tree( ) syntax structure for a current coding unit exists, and if cu_cbf is 0, this may indicate that no transform_tree( ) syntax structure for the current coding unit exists. If cu_cbf does not exist (if not parsed), cu_cbf may be determined according to the following conditions i) and ii).

i) If cu_skip_flag[x0][y0] is 1, cu_cbf may be configured to 0.

ii) Otherwise (if cu_skip_flag[x0][y0] is 0), cu_cbf may be configured to 1.

For example, if the current block is in the skip mode, a syntax element related to a residual signal for the current block may not be obtained from a bitstream. Therefore, in this case, cu_cbf may be configured to 0.

In an eighth conditional statement 1080 of FIG. 10, if cu_cbf is 1, processing may be performed for a syntax element related to the residual signal for the current coding unit in the transform_tree( ) syntax structure. In the transform_tree( ) syntax structure, a transform tree may be divided, and the transform_tree may be divided using the current coding unit as a root node. A leaf node of the transform_tree may be a transform unit, and the syntax element related to the residual signal and a transform coefficient may be coded in a transform_unit( ) syntax structure, which is a syntax structure related to the transform unit. The transform_tree( ) syntax structure receives (x0, y0) that is an upper-left coordinate of the block, cbWidth that is a width of the block, cbHeight that is a height of the block, and variable treeType indicating a type of the currently processed coding tree.

A problem exists in the seventh conditional statement 1070 of FIG. 10 described above. A merge mode may be classified into a skip mode and a merge mode other than the skip mode, and if a related syntax element is used, the merge mode be classified into i) and ii) as follows.

i) Skip mode (cu_skip_flag[x0][y0] 1 && merge_flag[x0][y0]==1): If cu_skip_flag[x0][y0] is 1, this indicates that the block is coded with the skip mode, and since the skip mode is a special case of the merge mode, merge_flag[x0][y0] may not be parsed and may be configured to 1. The skip mode is a merge mode in which no residual signal exists, and thus cu_cbf may not be parsed from a bitstream and may be configured to 0.

ii) Merge mode other than skip mode (cu_skip_flag[x0][y0]==0 && merge_flag[x0][y0]==1): If cu_skip_flag[x0][y0] is 0 in "else" statement (if CuPredMode[x0][y0] is not MODE_INTRA) of the third conditional statement 1030 of FIG. 10, merge_flag[x0][y0] may be parsed. In this case, if cu_skip_flag[x0][y0] is 0 and merge_flag[x0][y0] is 1, this may indicate the merge mode other than skip mode. In the case of the merge mode in which no residual signal exists, the merge mode may be indicated as the skip mode, so that it may be inferred that a residual signal always exists in the case of the merge mode other than the skip mode. Therefore, cu_cbf may not be parsed from the bitstream and may be configured to 1.

In view of the above, the seventh conditional statement 1070 of FIG. 10 may be configured as follows.

if (CuPredMode[x0][y0]!=MODE_INTRA && merge_flag[x0][y0]==0)
cu_cbf

The conditional statement modified as above enables cu_cbf to be parsed from the bitstream so as to obtain a value of cu_cbf only when CuPredMode[x0][y0] is not MODE_INTRA and merge_flag[x0][y0] is 0. Accordingly, a decoder acquires the value of cu_cbf from the bitstream only when the prediction mode of the current block is neither the intra mode nor the merge mode.

If the name of variable merge_flag is referred to as general_merge_flag, the seventh conditional sentence 1070 of FIG. 10 may be expressed as follows.

if (CuPredMode[x0][y0]!=MODE_INTRA && general_merge_flag[x0][y0]==0)
cu_cbf

If the name of variable merge_flag is referred to as general_merge_flag and the name of variable cu_cbf is referred to as cu_cbf_flag, the seventh conditional statement 1070 of FIG. 10 may be expressed as follows.

if (CuPredMode[x0][y0]!=MODE_INTRA && general_merge_flag[x0][y0]==0)
cu_cbf_flag Subsequently, the eighth conditional statement 1080 of FIG. 10 may be configured as follows.

if (cu_cbf)
transform_tree(x0, y0, cbWidth, cbHeight, treeType);

In this case, if the value of cu_cbf is 1, the transform_tree( ) syntax structure having x0, y0, cbWidth, cbHeight, and treeType variables as input parameters is performed to additionally acquire remaining information necessary for transformation.

According to the seventh conditional statement 1070 of FIG. 10, CuPredMode[x0][y0] operates by signaling and parsing cu_cbf for ii) described above, not for MODE_INTRA. This is to unnecessarily signal the syntax element when it is obvious that the transform_tree( ) syntax structure exists, and thus coding efficiency may be degraded.

FIG. 14 is a diagram showing a syntax structure of a coding unit (coding_unit) that solves the cu_cbf signaling and parsing problem described above. For details that are not described in FIG. 14, reference may be made to the contents of FIG. 10 to FIG. 13. Hereinafter, a modified condition for signaling and parsing cu_cbf will be described.

In a seventh conditional statement 1470 of FIG. 14, if CuPredMode[x0][y0] is not MODE_INTRA, and if cu_skip_flag[x0][y0] is 0, a syntax element of cu_cbf, which indicates whether the transform_tree( ) syntax element exists, may be parsed. Accordingly, a decoder may parse cu_cbf from the bitstream if a prediction mode of a current block is neither an intra mode nor a merge mode, and if the prediction mode of the current block is the intra mode or the merge mode, cu_cbf may not be parsed from the bitstream. The merge mode may include a skip mode and a merge mode other than the skip mode.

If a value of merge_flag[x0][y0] is 1, and it is thus determined that the merge mode is applied to the current block, the decoder may infer cu_cbf without parsing the same from the bitstream, by determining whether the current block is in the skip mode.

For example, if the merge mode is applied to the current block and is the skip mode, the decoder may not parse a value of cu_cbf from the bitstream, and may infer the value of cu_cbf to be 0, which is a value indicating that the transform_tree( ) syntax structure of the current block does not exist in the bitstream. If the merge mode is applied to the current block and is not the skip mode, the decoder may not parse cu_cbf from the bitstream, and may infer cu_cbf to be value 1 indicating that the transform_tree( ) syntax structure of the current block exists in the bitstream.

If a value of CuPredMode[x0][y0] is MODE_INTRA, the decoder may determine that intra prediction is applied to the current block, may not parse cu_cbf from the bitstream, and may infer cu_cbf to be 1 which is a value indicating that the transform_tree( ) syntax structure of the current block exists in the bitstream.

As above, the decoder may infer the corresponding value even without signaling and parsing cu_cbf for the merge mode, and therefore it is not necessary to signal and parse cu_cbf via the bitstream. Therefore, unnecessary signaling may be reduced.

Accordingly, if the prediction mode of the current block is neither an intra mode nor the merge mode, the encoder may include cu_cbf in the bitstream, and if the prediction mode of the current block is the intra mode or the merge mode, the encoder may not include cu_cbf in the bitstream. Therefore, it is possible to reduce the amount of bitstream generated by encoding an image.

In the generated bitstream, if the prediction mode of the current block is neither the intra mode nor the merge mode, cu_cbf is included in the bitstream. If the prediction mode of the current block is the intra mode or the merge mode, cu_cbf is not included in the bitstream. Accordingly, the size of the bitstream may be reduced compared to the case of the scheme in FIG. 10.

FIG. 15 is a diagram describing a method of signaling and parsing a syntax element of rqt_root_cbf in the conventional technology.

In rqt_root_cbf in a table showing a syntax structure of part (a) of FIG. 15, if CuPredMode[x0][y0] is not MODE_INTRA, PartMode is not PART 2N×2N, or merge_flag[x0][y0] is 0, a corresponding "if" statement is true, so that rqt_root_cbf is signaled, and the decoder may obtain a value thereof by parsing rqt_root_cbf from a bitstream. Part (b) of FIG. 15 describes semantics of rqt_root_cbf. In particular, if the above condition corresponding to "if" statement is not satisfied, rqt_root_cbf does not exist, in which case, the value of rqt_root_cbf may be inferred. The inferred value may be 0 or 1. However, in the semantics, if rqt_root_cbf does not exist, it is described that the value of rqt_root_cbf is inferred to be 1. In this case, if rqt_root_cbf does not exist, the value of rqt_root_cbf is always inferred to be 1, so that indication of "if" statement in the syntax cannot be fully explained. The value of rqt_root_cbf may obviously be inferred to be 0. If cu_skip_flag is 1, rqt_root_cbf may be inferred to be 0.

FIG. 16 is a diagram illustrating an improvement in semantic contents of a syntax element of rqt_root_cbf.

As a method for improving the problem mentioned in FIG. 15 above, if rqt_root_cbf does not exist, a method of inferring a value thereof may be described as in the content of (b) of FIG. 16. If a value of cu_skip_flag[x0][y0] is equal to 1, rqt_root_cbf is inferred to have a value of 0, otherwise, rqt_root_cbf is inferred to have a value of 1.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A video signal decoding apparatus, comprising a processor,
    wherein the processor is configured to:
    parse a first parameter, wherein the first parameter indicates whether a skip mode is applied to a current block;
    parse a second parameter, when the first parameter indicates the skip mode is not applied to the current block, wherein the second parameter indicates whether a merge mode is applied to the current block, wherein when the first parameter indicates that the skip mode is applied to the current block, the second parameter is not parsed, and a value of the second parameter is inferred as a value indicating that the merge mode is applied to the current block; and
    parse a third parameter, when the second parameter indicates that the merge mode is not applied to the current block,
    wherein the third parameter indicates whether a syntax structure regarding transformation is present for a coding unit related to the current block,
    wherein when the second parameter indicates that the merge mode is applied to the current block, the third parameter is not parsed, and a value of the third parameter is inferred based on the first parameter,
    wherein when the first parameter indicates that the skip mode is applied to the current block, the value of the third parameter is inferred as a value indicating that the syntax structure regarding transformation is not present for the coding unit related to the current block,
    wherein when the first parameter indicates that the skip mode is not applied to the current block, the value of the third parameter is inferred as a value indicating that the syntax structure regarding transformation is present for the coding unit related to the current block,
    wherein, the first parameter is parsed based on a type of slice including the current block.

2. A video signal encoding apparatus, comprising a processor,
    wherein the processor is configured to:
    encode a first parameter, wherein the first parameter indicates whether a skip mode is applied to a current block;
    encode a second parameter, when the first parameter indicates that the skip mode is not applied to the current block, wherein the second parameter indicates whether a merge mode is applied to the current block, wherein when the first parameter indicates the skip mode is applied to the current block, the second parameter is not encoded, and a value of the second parameter is inferred as a value indicating that the merge mode is applied to the current block; and
    encode a third parameter, when the second parameter indicates that the merge mode is not applied to the current block,
    wherein the third parameter indicates whether a syntax structure regarding transformation is present for a coding unit related to the current block,
    wherein when the second parameter indicates that the merge mode is applied to the current block, the third parameter is not encoded, and a value of the third parameter is inferred based on the first parameter,
    wherein when the first parameter indicates that the skip mode is applied to the current block, the value of the third parameter is inferred as a value indicating that the syntax structure regarding transformation is not present for the coding unit related to the current block,
    wherein when the first parameter indicates that the skip mode is not applied to the current block, the value of the third parameter is inferred as a value indicating that the syntax structure regarding transformation is present for the coding unit related to the current block,
    wherein, the first parameter is encoded based on a type of slice including the current block.

3. A method for transmitting a bitstream generated by encoding a video signal, the method comprising:
    encoding a first parameter, wherein the first parameter indicates whether a skip mode is applied to a current block;
    encoding a second parameter, when the first parameter indicates that the skip mode is not applied to the current block, wherein the second parameter indicates whether a merge mode is applied to the current block, wherein when the first parameter indicates the skip mode is applied to the current block, the second parameter is not encoded, and a value of the second parameter is inferred as a value indicating that the merge mode is applied to the current block;
    encoding a third parameter, when the second parameter indicates that the merge mode is not applied to the current block, wherein the third parameter indicates whether a syntax structure regarding transformation is present for a coding unit related to the current block; and
    outputting the bitstream including at least one of the first parameter, the second parameter and the third parameter,
    wherein when the second parameter indicates that the merge mode is applied to the current block, the third parameter is not encoded, and a value of the third parameter is inferred based on the first parameter,
    wherein when the first parameter indicates that the skip mode is applied to the current block, the value of the third parameter is inferred as a value indicating that the syntax structure regarding transformation is not present for the coding unit related to the current block, wherein when the first parameter indicates that the skip mode is not applied to the current block, the value of the third parameter is inferred as a value indicating that the syntax structure regarding transformation is present for the coding unit related to the current block, wherein, the first parameter is encoded based on a type of slice including the current block.

* * * * *